Patented Apr. 15, 1952

2,592,775

UNITED STATES PATENT OFFICE 2,592,775

PREPARATION OF CATALYST CONTAINING SILICA AND ALUMINA OR MAGNESIA OR BOTH

James P. West, Westmont, Ill., assignor to Universal Oil Products Company, Chicago, Ill., a corporation of Delaware No Drawing. Application September 29, 1948, Serial No. 51,844

8 Claims. (Cl. 252—453)

This invention relates to the preparation of catalytically active composites containing silica, alumina, and/or magnesia which are particularly useful in catalyzing hydrocarbon cracking reactions, especially for the production of gasoline utilizing high-boiling petroleum fractions as charging stocks. More specifically, the invention concerns catalytically active metal oxide composites comprising silica and at least one component selected from the group consisting of alumina and magnesia which are prepared by a metathasis-type of reaction between an alkyl ortho-silicate and an organic acid salt of aluminum and/or magnesium formed at selected reaction conditions.

Silica-base catalysts containing alumina and/or magnesia in intimate association therewith have been widely known and utilized by the prior art as catalysts for effecting specific hydrocarbon conversion reactions, such as the cracking of high molecular weight petroleum hydrocarbons for the production of motor fuel gasolines therefrom. These catalysts which have been invariably prepared by impregnating a silica sol particle with the salt of aluminum and/or magnesium, and then subsequently converting the aluuminum and/or magnesium salt to the corresponding oxides, are characterized generally by their high density as compared to the catalyst of the present invention and a relatively low porosity, again on the basis of comparison with the present catalyst composites. The use of catalysts having low densities and high porosities accompanied by high activities has become increasingly important since the advent of fluidized processes in the treatment of petroleum fractions, such as fluidized cracking processes.

High porosity and low density are particularly advantageous qualities in a catalyst when it is to be utilized in fluidized processes because of the ease of maintaining the catalyst in suspension in the reactant vapors during the reaction and the high conversion of charging stocks resulting thereby. The silica-base catalysts prepared by the process of the present invention are characterized by their low density as well as high porosity and their relatively high degree of activity in catalytic cracking reactions. The present catalyst is therefore especially recommended for fluidized processes wherein the aforesaid physical properties are especially advantageous.

One object of the present invention is to prepare a catalyst composite containing silica, alumina and/or magnesia which is particularly active in promoting hydrocarbon cracking reactions, especially in fluidized processes of this type.

Another object of this invention is to provide improved silica-base catalysts containing alumina and/or magnesia free of foreign impurities which tend to reduce the catalytic activity and life of the composite.

In one of its embodiments the present invention relates to a process for the preparation of a hydrocarbon cracking catalyst consisting of a composite of the oxides of silicon and at least one oxide of a metal selected from the group consisting of alumina and magnesia which comprises reacting an alkyl ortho-silicate with at least one metal acid salt selected from the group consisting of a monobasic aluminum acid salt and a magnesium di-acid salt for a time, temperature, and pressure sufficient to form said catalyst composite substantially free of organic material.

Another embodiment of the invention relates to a process for the production of a catalyst comprising a composite of silica and alumina by reacting a basic aluminum acid salt of an organic acid with an alkyl ortho-silicate at a temperature of from about 150° to about 300° C., and at a pressure sufficient to maintain at least partial liquid phase, thereafter releasing the ambient pressure and recovering from the residue said composite of silica and alumina.

Still another catalyst which may be prepared by means of the present procedure is a silica-base magnesia catalyst formed by the process which comprises reacting ethyl ortho-silicate and magnesium diacetate at a temperature of from about 150° to about 300° C. and at a pressure sufficient to maintain at least a portion of the reactants in substantially liquid phase, up to about 100 atmospheres, and thereafter recovering a composite of magnesium and silicon oxides from the reaction mixture.

Other objects and specific embodiments of the present invention will be hereinafter referred to in greater detail in the following further description of the invention.

The catalyst composites of the present invention contianing silica as a component common to all of said composite catalysts, are prepared by means of a metathasis-type of reaction between an alkyl ortho-silicate as one of the reacting components and an organic acid salt of magnesium and/or aluminum, preferably a carboxylic acid salt of the lower fatty acid series. The alkyl ortho-silicate reactant is preferably selected from the alcohol esters of silicic acid containing at least two and not more than five carbon atoms per molecule, such as ethyl ortho-silicate, propyl ortho-silicate, etc., including amyl ortho-silicate. These latter silicic acid esters are preferred because of the desirability of maintaining substantially liquid phase during the course of the metathasis reaction and the ability of maintaining said esters in liquid phase at the reaction conditions herein specified. Further preference is accorded ethyl ortho-silicate not only because of the relative ease of maintaining the same in liquid phase at the reaction temperatures herein specified, but, further, because of its relative cheapness and general availability.

The reactant referred to herein as a metal acid salt selected from at least one metal of the group consisting of aluminum and magnesium are preferably the corresponding salts of a mono-carboxylic acid selected from the members of the fatty acid series. The monobasic aluminum acid salts are prepared, for example, by reacting aluminum oxide, such as an alumina ore containing gamma-alumina, with an organic acid at a temperature sufficient to form the monobasic aluminum acid salt. For this purpose, impure oxide ores, such as the natural trihydrates or the mixed hydrates and anhydrides, may be reacted with the acid and the salts formed thereby removed from the reaction product. The corresponding magnesium acid salts are similarly prepared by reacting magnesia or precipitated magnesium hydroxide with the acid at suitable reaction conditions to form the mono- or di-acid salts. Suitable organic acids utilizable to form the aluminum and magnesium acid salts include acetic acid, and formic acid which are preferred herein, tri-chloroacetic acid, dichloroacetic acid, mono-chloroacetic acid, oxalic acid, malonic acid, succinic acid, tartaric acid, benzoic acid, and others. In the case of aluminum, the reaction of an alumina ore such as aluminum oxide trihydrate is represented in the following equation where acetic acid represents a typical organic acid reactant.

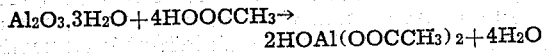

The product is a mono-basic aluminum acetate salt comprising one of the preferred reactants involved in the present process for the preparation of a silica-base alumina catalyst. In the case of the reaction of magnesia with an acid of the above series, the di-acid salt of magnesium is formed in the presence of an excess of the acid reactant which is capable of reacting with ethyl-ortho-silicate to form the silica-magnesia catalyst of the present invention. A mono-carboxylic acid reacts with magnesia yielding the di-acid salt as represented by magnesium di-acetate formed by the reaction of magnesia with acetic acid. In utilizing a di-carboxylic acid, the corresponding magnesium salt is a magnesium mono-acid salt such as magnesium succinate. If desired, a mixture of magnesium and aluminum acid salts may be utilized in the subsequent metathasis reaction to form a catalyst composite containing a mixture of magnesium and aluminum oxides composited with the silica component. The magnesium and aluminum acid salts are generally prepared by reacting the oxide ores with the particular acid desired at a temperature above about 150° C., preferably from about 180° to about 250° C. in the presence of an excess of the acid, generally from about 6 to 1, to about 12 to 1 molar proportions of the acid to the metal oxide ore.

The reaction of an alkyl ortho-silicate with an organic acid salt of magnesium and/or aluminum to form a catalytically active composite containing silica, magnesia, and/or alumina, depending upon whether an acid salt of magnesium or aluminum individually or a mixture of the two acid salts is employed in the metathasis reaction, is effected at temperatures within the range of from about 150° to temperatures below the normal decomposition point of the metal salt, generally about 300° C., and preferably at temperatures of from about 200° to about 250° C. The reaction mixture is preferably maintained under pressure sufficiently high to provide substantially liquid phase conditions within the reaction mixture, generally up to about 100 atmospheres. Such pressures may be obtained in the reaction mixture by charging an inert gas, such as nitrogen, carbon monoxide, etc., into the reactor at the desired pressure prior to heating the mixture to reaction temperature. The proportion of the respective reactants utilized in the metathasis reaction, that is, the alkyl ortho-silicate and organic acid metal salt or salts, is dependent upon the ultimate composition desired in the final catalyst. Desirable and highly effective hydrocarbon cracking catalysts usually contain from about 0.1 to about 15% by weight of alumina, and/or magnesia in the final catalyst, preferably from about 2 to about 10% thereof. In order to obtain a final composite containing the desired proportion of metal oxide components, the theoretical proportion of the initial reactants which will yield the final composition is charged to the metathasis reaction mixture. Utilizing ethyl ortho-silicate, for example, as the component of the metathasis reaction mixture capable of yielding the silica component of the ultimate catalyst composite, 1 mole of the ethyl silicic acid ester or approximately 208 weight equivalents of the ester will yield 1 mole of silicon dioxide or approximately 60 weight equivalents thereof. Likewise, utilizing magnesium di-acetate as the component of the reaction mixture capable of yielding the magnesia component of the ultimate catalyst composite, approximately 142.3 weight equivalents of the acetate will yield 1 mole of magnesia or approximately 40.3 weight equivalents thereof. It is not to be assumed, however, that exact molar equivalents of the silica-yielding reactant and the magnesia- or alumina-yielding reactants need necessarily be employed in the metathasis reaction, since the reaction proceeds in the presence of a molar excess of either reactant and the proportion thereof desired will ultimately depend upon the desired composition of the catalyst composite.

The product of the initial metathasis reaction between the silica-yielding reactant and the magnesia and/or alumina-yielding reactant contains an excess of at least one of said reactants which, unless exact molar equivalents of said reactants were utilized in the reaction, is usually present to some extent in the product of the initial metathasis reaction. In order to convert this excess, ordinarily contained in the initial product, to the corresponding metal oxide, the product of the initial reaction is subsequently heated to a somewhat higher temperature, preferably in the presence of water under high pressures to hydrolyze the unconverted reactant to the metal oxide or hydroxide. Since the excess reactant is usually the alkyl ortho-silicate (that is, to ultimately prepare a catalyst containing from about 85 to about 99+% of the silica component, ordinarily utilized in hydrocarbon cracking reactions) heating of the initial reaction mixture thus ordinarily effects decomposition or hydrolysis of the excess alkyl ortho-silicate reactant forming silicon dioxide therefrom which becomes intimately admixed with the oxides formed by metathasis. Furthermore, if the initial reaction mixture contains any unconverted magnesium or aluminum acid salt, the latter components are likewise converted to their respective metal oxides during the conversion of the initial reaction mixture at relatively elevated temperatures following the initial metathasis reaction. The above-referred to heating operation or hydrolytic reaction is usually effected in a closed system under pressure and at temperatures of from about 150° to about 350° C. to substantially free the reaction residue of volatile matter. In case the desired reaction is to be one of hydrolysis, water in sufficient quantity to hydrolyze the remaining ortho-silicate ester or any residue of aluminum and/or magnesium organic acid salt is added to the reaction mixture and heated in the closed system at a superatmospheric pressure. The organic residues combined in the excess of the unconverted reactants are largely volatile and therefore are released from the reaction mixture following the completion of the secondary heating or hydrolytic reaction.

After completion of the secondary heating reaction, the product, usually a white, friable solid mass, is heated at a higher temperature to calcine the composite and activate the components for catalytic purposes. In the latter calcination, the reaction mass is heated to temperatures of from about 500° to about 800° C., usually in the presence of oxygen, such as a stream of air, which oxidizes any of the remaining organic residue to volatile components, which are removed from the catalyst reaction mixture and eliminated from the final composite. The resulting product may be ground to a powder and subsequently pelleted into pills of desired size for use in hydrocarbon conversion reactions or the original shape of the mass may be retained in its porous condition for use in the reaction. The reaction periods allowed for each of the preceding reaction steps is dependent upon the depth of conversion desired in each instance. For example, the initial metathasis reaction is usually completed after reaction periods of from about ½ to about 4 hours, although in most instances, from 1 to 2 hours is sufficient. The subsequent heat treatment or hydrolytic conversion is usually completed within ½ to about 3 hours, whereas the calcination stage of the process is desirably continued for a reaction period of from about 2 to about 5 hours. The finished catalyst composites of the present invention are notably free of sodium ions and other extraneous foreign impurities which often have an adverse effect on the catalytic activity and/or life of the catalyst composite. This is especially true when care is taken to select pure reactants or charging stocks, such as materials formed by subjecting the initial reactants to a purification treatment prior to the metathasis reaction. For example, a low grade aluminum oxide ore containing various extraneous impurities, such as iron, calcium, barium, etc. oxides or ions, may be substantially purified of said foreign impurities during the conversion of the alumina ore to the organic acid salt of aluminum. Thus, for example, in the preparation of basic aluminum acetate by the reaction of an alumina ore with acetic acid at the temperatures and pressures hereinbefore specified, very often water-soluble acetate salts of the impurities or salts which are soluble in the excess of the acid reagent are formed during the reaction which may be separated from the basic aluminum acetate product. The subsequently separated basic aluminum acetate when charged to the present reaction form composites which contain very little, if any, of the original impurities appearing in the alumina starting material. Catalysts of the prior art having a chemical composition somewhat similar to catalysts of this invention, in many cases contain alkali metal ions introduced into the composite during the preparation of the catalyst via precipitation of the metal oxides on a silica gel through the addition of an alkali metal hydroxide to a suspension of silica gel particles impregnated with a salt of aluminum and/or magnesium. The catalysts of this invention being free of deactivating foreign components, have higher activities and withstand repeated regeneration more effectively than has been observed in the case of even the best of the catalysts of the prior art.

The novel method of preparing silica-base catalysts by the process herein provided through a metathasis-type of reaction is essentially responsible for the unusually low density and high porosity characteristics of the present composites. The subsequent calcination of the catalyst composite product, while in its highly porous state, results in the formation of a structurally rigid catalyst particle, capable of withstanding considerable surface pressure.

The process of the present invention is further illustrated in the following examples which are limited to the preparation of specific catalysts and are not intended to define the scope of the invention in strict accordance thereto.

Basic aluminum acetate in the form of a granular white salt, insoluble in water and formed by reacting 10 parts by weight of anhydrous alumina (a product of the Harshaw Chemical Company) with 103 parts by weight of glacial acetic acid at a temperature of 180° C. and at a pressure of 50 atmospheres of nitrogen in a rotating autoclave for 6 hours, subsequently filtered and dried at approximately 100° C. to remove the last traces of acetic acid from the solid salt, was utilized as the organic acid salt of aluminum capable of yielding alumina in accordance with the present process. A mixture of 40 weight proportions (0.19 molar proportions) of ethyl orthosilicate and 32 weight proportions (0.10 molar proportion) of the above basic aluminum acetate was heated at 200° for 6 hours in a rotating autoclave. The product, consisting of a white, hard solid and a very slightly yellow liquid, weighed 69 weight proportions. The liquid portion of the product readily distilled from the hard white solid at subatmospheric pressure and re-distillation of the liquid indicated that it consisted of a mixture of ethyl ether and ethyl acetate. The 39 weight proportions of white solid remaining after evaporation of the liquid product was heated in an oven at 200° C. for 3 hours, yielding a product weighing 32 weight proportions. The latter product heated in an air stream at approximately 550° C. for 2 hours yielded 20 grams of a hard white solid which was ground to pass through a 30-mesh screen.

The powdered solid prepared as in the above procedure and comprising a composite of alumina and silica was pressed into the shape of pills of approximately ¼" by ¼" dimensions and utilized as the catalyst in a test to determine the ability of the composite to catalytically crack hydrocarbons. A Mid-Continent gas-oil fraction having an API gravity of 31.4 and an initial boiling point of approximately 465° F. was passed over a solid bed of the catalyst contained in a furnace maintained at a temperature of approximately 932° F. at a space velocity of approximately 4 volumes of said gas-oil fraction per volume of catalyst per hour. The catalyst was on stream for a test period of approximately 2 hours. The liquid hydrocarbon product boiling at a temperature above 400° F. was condensed in the receiver and the gaseous fraction, together with the gasoline product boiling at a temperature below about 400° F., was collected in a separate vessel. The weight per cent conversion, expressed as the total weight of 400° F. end point gasoline formed in the conversion and uncondensed gas divided by the weight of the oil charged and the result multiplied by 100 for the present catalyst was 24.2% on a once through basis.

I claim:

1. A process for the production of a catalyst composite comprising silica and at least one metal oxide selected from the group consisting of alumina and magnesia which comprises reacting an alkyl ortho-silicate with at least one organic acid metal salt selected from the group consisting of a monobasic aluminum organic acid salt and a magnesium organic acid salt at temperature of from about 150° to about 300° C. and under a pressure sufficient to maintain at least a portion of the reaction mixture in liquid phase, and calcining the resultant reaction product.

2. A process for the production of a catalyst composite comprising silica and at least one metal oxide selected from the group consisting of alumina and magnesia, which comprises reacting an alkyl ortho-silicate with at least one organic acid metal salt selected from the group consisting of a monobasic aluminum organic acid salt and a magnesium organic acid salt at a temperature of from about 150° to about 300° C. and at a pressure sufficient to maintain at least a portion of the reaction mixture in liquid phase, and thereafter heating the resulting product in the presence of oxygen to calcine the solid residue and form said catalyst composite substantially free of organic material.

3. The process of claim 2 further characterized in that the reaction product is heated to a temperature of from about 500° to about 800° C.

4. A process for the production of a catalyst composite comprising silica and at least one metal oxide selected from the group consisting of alumina and magnesia, which comprises reacting an alkyl ortho-silicate with at least one organic acid metal salt selected from the group consisting of a monobasic aluminum organic acid salt and a magnesium organic acid salt at a temperature of from about 150° to about 300° C. and at a pressure sufficient to maintain at least a portion of the reaction mixture in liquid phase, heating the resulting product in the presence of water at a temperature of from about 150° to about 350° C. and at a superatmospheric pressure to hydrolyze unreacted components and thereafter calcining the recovered solid residue to form said catalyst composite substantially free of organic material.

5. A process for the production of a catalyst composite comprising silica and alumina which comprises reacting an alkyl ortho-silicate with monobasic aluminum acetate at a temperature of from about 150° to about 300° C. and under a pressure sufficient to maintain at least a portion of the reaction mixture in liquid phase and calcining the resultant reaction product.

6. A process for the production of a catalyst composite comprising silica and magnesia which comprises reacting an alkyl ortho-silicate with magnesium di-acetate at a temperature of from about 150° to about 300° C. and under a pressure sufficient to maintain at least a portion of the reaction mixture in liquid phase, and calcining the resultant reaction product.

7. A process for the production of a catalyst composite comprising silica and alumina which comprises reacting ethyl ortho-silicate with monobasic aluminum acetate at a temperature of from about 150° to about 300° C. and under a pressure sufficient to maintain at least a portion of the reaction mixture in liquid phase, and calcining the resultant reaction product.

8. A process for the production of a catalyst composite of silica and alumina which comprises reacting ethyl ortho-silicate and monobasic aluminum acetate at a reaction temperature of from about 180° to about 250° C. and at a pressure sufficient to maintain the reactants in substantially liquid phase, thereafter adding water to the resulting residue and heating the mixture to a temperature of from about 150° to about 250° C., at a superatmospheric pressure to hydrolyze unreacted components, and calcining the recovered solid product at a temperature of from about 500° to about 800° C. to form said catalyst composite substantially free of organic material.

JAMES P. WEST.

REFERENCES CITED

The following references are of record in the file of this patent:

UNITED STATES PATENTS

| Number | Name | Date |
| --- | --- | --- |
| 2,348,647 | Reeves et al. | May 9, 1944 |
| 2,391,481 | Ruthruff | Dec. 25, 1945 |
| 2,419,272 | Marisic et al. | Apr. 22, 1947 |
| 2,432,634 | Thomas | Dec. 16, 1947 |

OTHER REFERENCES

Journal American Chemical Society, vol. 50, pp. 3060–3061, Nov. 1928. (Copy in Lib.)